United States Patent [19]

Totten

[11] 4,416,430
[45] Nov. 22, 1983

[54] LOAD LOWERING DEVICE

[75] Inventor: Roger Totten, Ventura, Calif.

[73] Assignee: Draft Systems, Inc., Northridge, Calif.

[21] Appl. No.: 344,622

[22] Filed: Feb. 1, 1982

[51] Int. Cl.³ .............................................. B65H 75/48
[52] U.S. Cl. .................................. 242/107.3; 74/789;
294/78 R; 182/237; 182/239
[58] Field of Search ............................... 242/107.3, 99;
188/82.77, 135, 136; 182/237, 239; 74/789, 792;
212/146; 294/78 R, 82 R; 24/230.5 R, 230.5
AD; 267/71; 254/364

[56] References Cited

U.S. PATENT DOCUMENTS

| | | | |
|---|---|---|---|
| 835,985 | 11/1906 | Sharp | 182/239 X |
| 2,665,128 | 1/1954 | Guffey | 294/78 R X |
| 2,672,364 | 3/1954 | Ragland | 24/230.5 AD |
| 2,791,397 | 5/1957 | Coffman | 242/107.4 B X |
| 2,896,912 | 7/1959 | Faugier et al. | 242/107.3 |
| 3,041,044 | 6/1962 | Nixon | 242/107.3 |

FOREIGN PATENT DOCUMENTS 1497666  9/1967  France ............................... 294/78 R
55314  9/1920  Sweden ............................. 294/78 R Primary Examiner—John M. Jillions
Attorney, Agent, or Firm—James E. Brunton

[57] ABSTRACT

A compact, self-contained device for use in safely lowering filled beer kegs from the bed of a delivery truck to the ground. The device includes a hollow drum rotatably carried within a sealed housing which can be removably interconnected to a rigid support in the load bay of the truck. A length of cable is wound about the drum and the free end thereof is connected to the keg chimes by means of a unique harness assembly. When the keg is pushed from the truck the cable is uniformly paid out from the drum against the urging of a rewind spring. The rate of descent of the keg to the ground is precisely controlled through a speed increaser housed within the drum which drives a novel centrifugal brake at high speeds producing a predetermined amount of drag on the drum. Upon disconnecting the harness assembly the cable is automatically rewound on the drum by the rewind spring.

10 Claims, 8 Drawing Figures

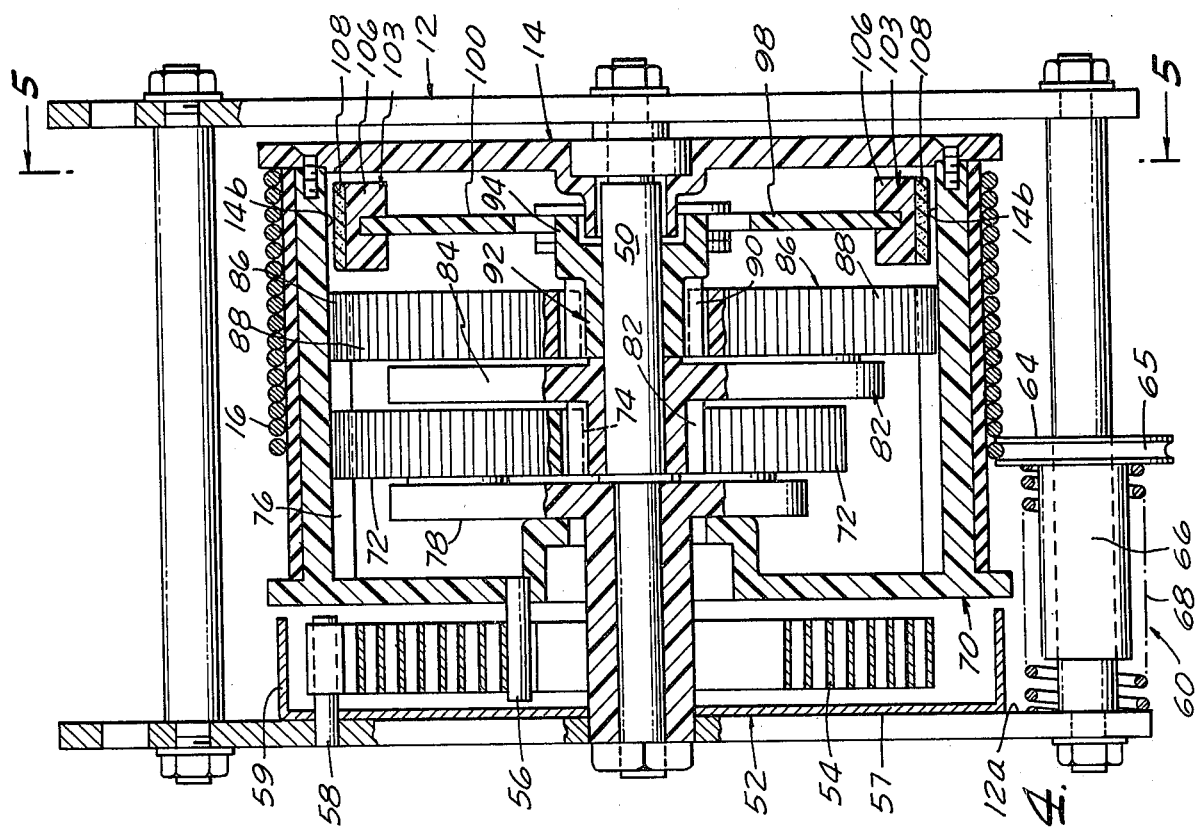
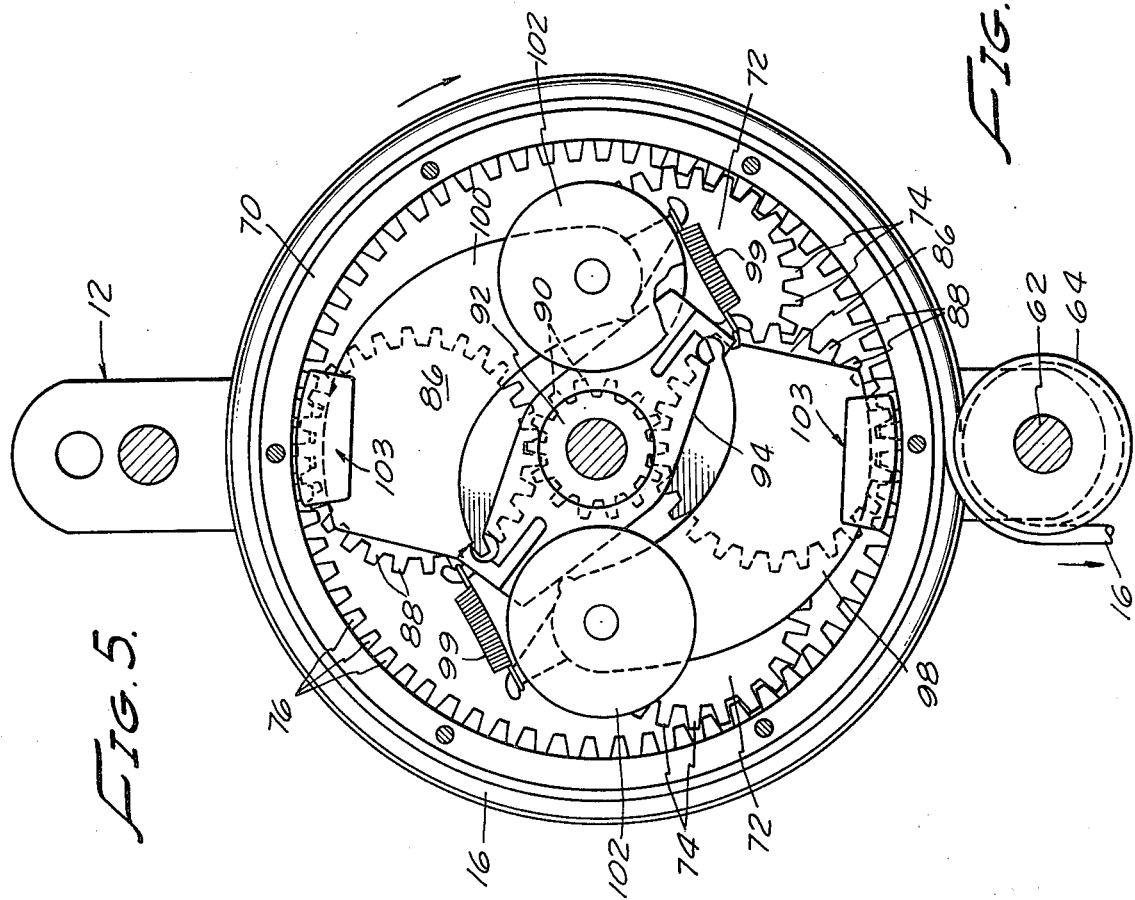

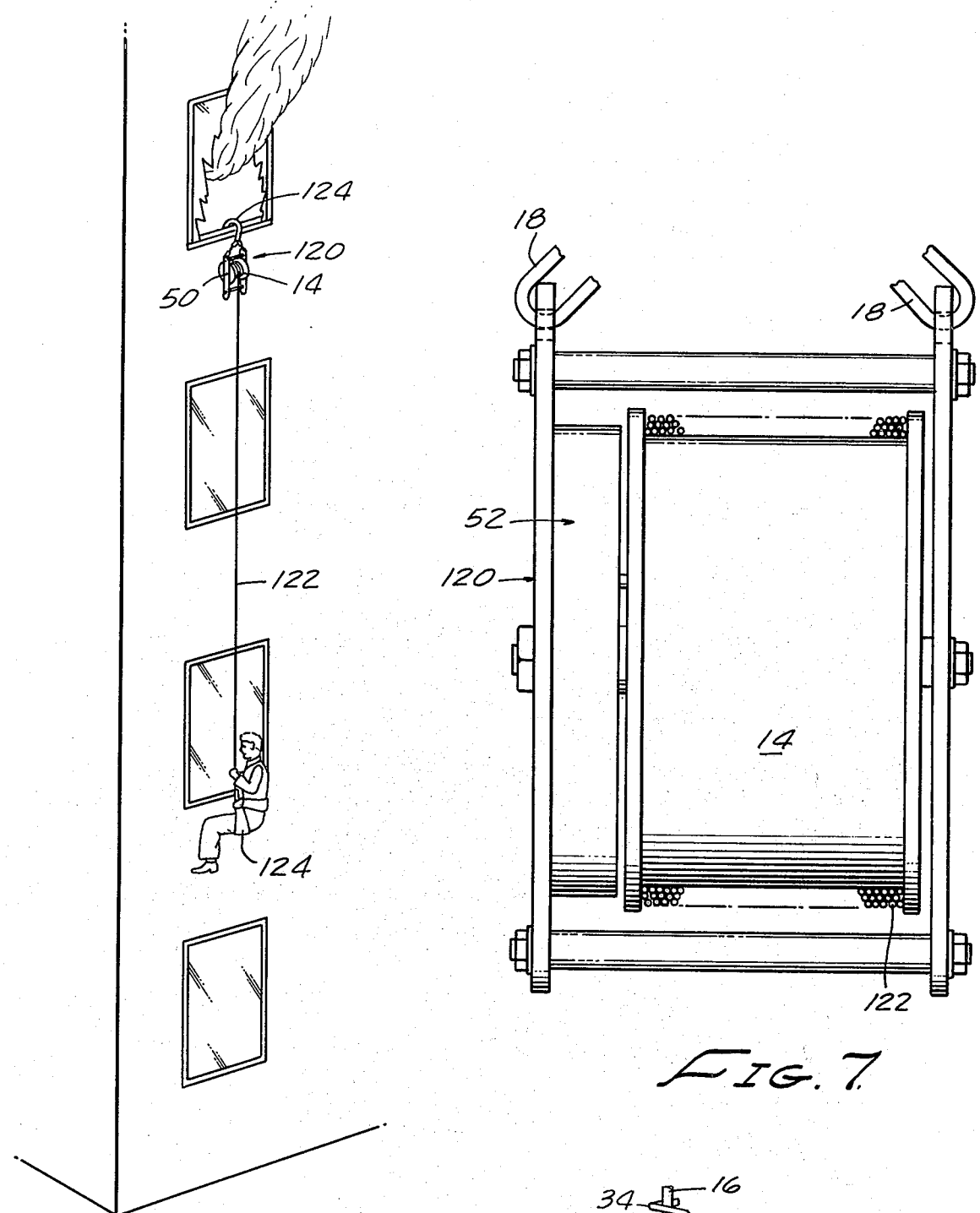
FIG. 6.
FIG. 7.
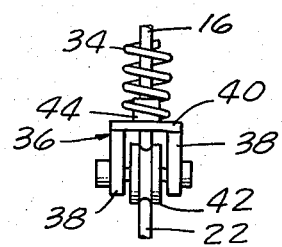
FIG. 8.

LOAD LOWERING DEVICE

BACKGROUND OF THE INVENTION

1. Field of the Invention

The present invention relates generally to load lowering devices adapted to lower a load from a first elevated position to a second lower position at a regulated rate of speed. More particularly, one form of the device of the invention is specially designed for use in controllably lowering beer kegs from the bed of a truck to the ground in a manner as to avoid damage to the keg. Another form of the device of the invention is adapted to use as a compact, light weight, reliable and extremely safe escape device suitable for use in escape from windows of skyscrapers during emergency situations.

2. Discussion of the Prior Art

An important use of the device of the present invention is for safely and conveniently lowering filled beer kegs from beer delivery trucks to the ground.

The critical need for such a device in the brewing industry is brought about by the substantial amount of keg damage that is sustained in removing the kegs from the delivery trucks and personal injury and property damage done by out of control kegs. In current practice, beer kegs weighing approximately 165 pounds each are stacked up to three high in the load bays of a delivery truck by use of a forklift. The delivery man typically has no type of mechanical aid available to assist in removing the kegs from the truck at the delivery site. Therefore, common practice is for the delivery man to let the keg free fall some five or six feet to the ground level. A rubber bumper pad may or may not be used to cushion the impact. Consequently, severe damage can result to the keg chimes and bodies which may require time consuming and expensive repair or, on occasion, renders the keg totally unserviceable.

In the past various solutions to the problem have been suggested, including the use of compressed gas or electrically operated devices. However, such devices are quite expensive and frequently are unreliable and difficult to use. Additionally, when such devices are used the delivery truck must be equipped with auxiliary equipment to provide the necessary electrical power or compressed gas.

Another solution suggested in the past is to provide the delivery truck with electrically or hydraulically operated tail gates or similar load lowering mechanisms. These devices are also typically very expensive and require the provision of bulky and expensive auxilliary equipment on the delivery truck for their operation.

As will become apparent from the discussion which follows, these and other drawbacks of the prior art devices are effectively overcome by the compact, fully self-contained and highly safe and reliable load lowering device of the present invention.

Another important use of the device of the invention is as a unique personnel escape mechanism adapted for use in the escape from multistoried buildings such as hotels, office buildings and the like.

Numerous types of fire escape devices have been suggested in the past. Typically these devices, because of their size and weight, are fixedly located within the building adjacent a window thereof. Often they are of complex design and are difficult and time consuming to use. Further, unless the devices are continuously checked and maintained, the chances of their failing during emergency situations is quite high. While the prior art devices embody a wide variety of mechanisms for regulating the rate of descent of the person, most are highly suspect from a safety and reliability standpoint particularly when the person must be lowered hundreds of feet as may be the case in escape from multistory skyscrapers.

The present invention provides for the first time a highly versitile escape device which is compact, light weight, easily portable and totally reliable. The device is simple to use, can be quickly and easily manipulated in emergency situations even by persons of small stature and provides a completely safe means of escape from multistory buildings in the event of fire or other emergency.

SUMMARY OF THE INVENTION

In summary, the device of the present invention comprises a load lowering cable or line which is coiled onto a hollow, rotatable drum by a grooved roller and cooperating spring mechanism which packs the coils uniformly adjacent to one another about the periphery of the drum. A power spring provides sufficient torque to expeditiously coil the cable onto the drum after it has been paid out therefrom.

In using the device in the delivery of beer kegs, the drum housing is attached to the truck overhead structure in the load bay and the free end of the cable is attached to a keg chime by means of a specially configured harness arrangment. When the keg is pushed out of the truck, the lowering device controls the rate of descent to the ground level. When the device is unhooked from the keg, the cable automatically retracts at a controlled rate to the starting position, ready for another keg.

In one form of the invention, when a load is applied to the cable, the drum rotates, feeding the cable out. The rate of feed is controlled through a geared speed increaser that drives a centrifugal brake at high speed and produces a drag on the drum, thus converting the potential energy in the keg to kinetic energy as the keg descends.

With the keg at ground level, only the light return spring load must be overcome to release the harness from the keg. Similarly, the centrifugal brake operates in the reverse direction to gradually retract the cable.

It is an object of the present invention to provide a novel, light weight, fully self-contained and easily portable load lowering device capable of being stored within a small place.

More particularly it is an object of the invention to provide a device of the aforementioned character which embodies an elongated load lowering cable, or support member, and a cooperating control mechanism adapted to be conveniently used to controllably lower heavy and bulky containerized or palletized loads from the back or sides of trucks in a manner as to prevent damage to the load and injury to adjacent workman.

It is another object of the present invention to provide a device of the type described in the preceeding paragraphs which is fully self-contained and requires no external power or driving source.

A specific object of the invention is to provide a device of the character described which can be used to quickly and conveniently unload filled beer kegs from a delivery truck in a manner as to prevent damage to the kegs and particularly to the chimes of the kegs.

A further object of the invention is to provide a device as described in the preceeding paragraphs which includes means for quickly and easily removably affixing the device to a support within the truck and also includes either fluid or mechanical means for controlling the speed with which the load is lowered to the ground.

Another object of the invention is to provide a device of the class described which includes a mechanism for automatically rewinding the flexible cable upon disconnecting the load from the device.

It is a specific object of the invention to provide a device of the aforementioned character which is provided with a uniquely designed harness arrangement which enables quick and positive interconnection of the device with the upper and lower chime portions of the keg. Included as a part of the harness arrangement is a shock absorbing mechanism which is adapted to cushion the shock imparted to the cable system by the filled beer keg being pushed from the truck bed.

It is still another important object of the present invention to provide a device of the character described in the first paragraph of this Summary which can be safely and conveniently used as a compact, portable fire escape device adapted to accommodate a very long cable or supporting member, and a cooperating control mechanism capable of safely lowering a person to the ground at a regulated rate of speed from either a window or from the roof of a multistory skyscraper.

It is another object of the invention to provide an escape device of the character set forth in the previous paragraph which is compact, easily manipulated by persons of limited strength and readily manually attachable to fixed supports within the building for rapid escape from the building during emergency situations.

It is still another object of the invention to provide a device of the aforementioned character in which the control mechanisms which govern the pay out of the load lowering cable are incorporated within a closed housing and are adequately protected against dust, dirt, the effects of rain and the like.

It is yet another object of the invention to provide a device of the general class herein described which is highly reliable, simple to operate and inexpensive to manufacture.

BRIEF DESCRIPTION OF THE DRAWINGS

FIG. 4 is a greatly enlarged side elevational view of a portion of the device partly in cross-section showing internal construction.

FIG. 5 is a cross-sectional view taken along lines 5—5 of FIG. 4.

FIG. 6 is a generally pictorial view showing an alternate form of the apparatus of the invention adapted for use as an escape device illustrating a person being lowered from an upper window of a building during an emergency situation.

FIG. 7 is a greatly enlarged side elevational view of the alternate embodiment of the invention shown in FIG. 6.

FIG. 8 is a side elevational view taken along lines 8—8 of FIG. 3.

DESCRIPTION OF ALTERNATE FORMS OF THE INVENTION

Figure 1:
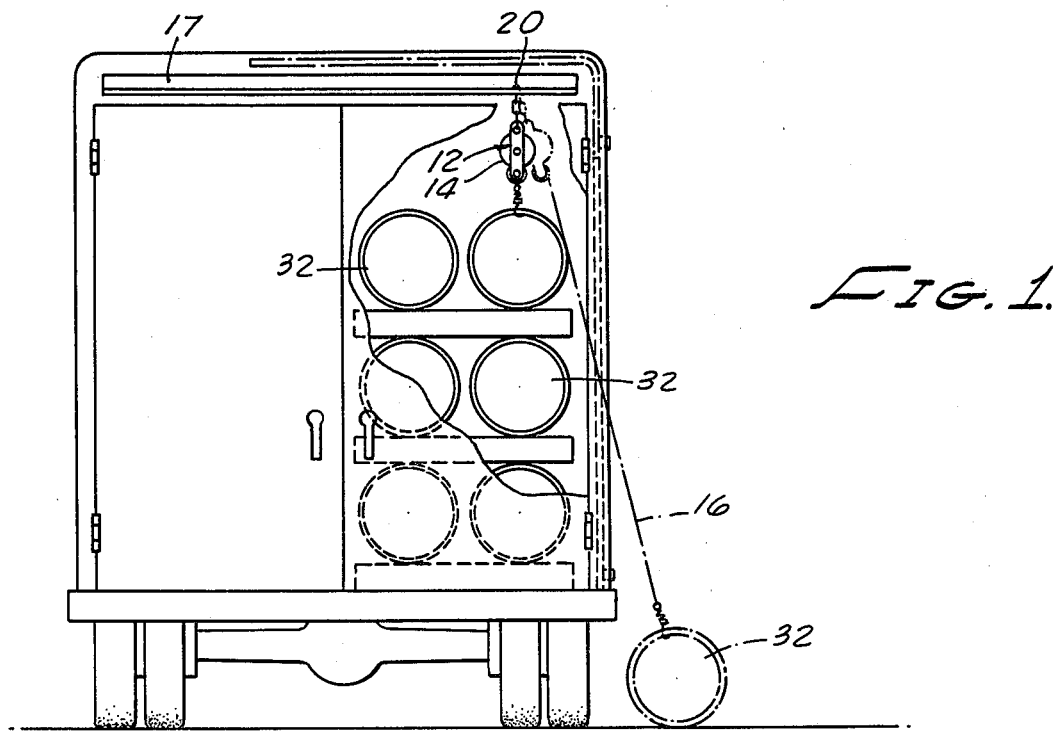
FIG. 1 is a generally pictorial view illustrating the device of the invention interconnected with a rigid support member disposed within the load bay of a delivery truck and with the load lowering harness thereof interconnected with a beer keg.

Referring to the drawings and particularly to FIGS. 1 through 5 thereof, the load lowering device of the present invention comprises an outer housing, or cage 12; a hollow drum 14 rotatably mounted within housing 12; a length of cable 16 adapted to be uniformly wound about drum 14; and a load connecting means, or harness, associated with the outer, or lower, end of the cable for connecting the cable to the load to be lowered. Means for removably connecting the housing to a rigid support member 17 within the load bay of the delivery truck is here provided in the form of a length of chain 18 affixed at either end to housing 12 and an interconnecting hook 20 affixed to the chain intermediate its ends.

Figures 2, 3:
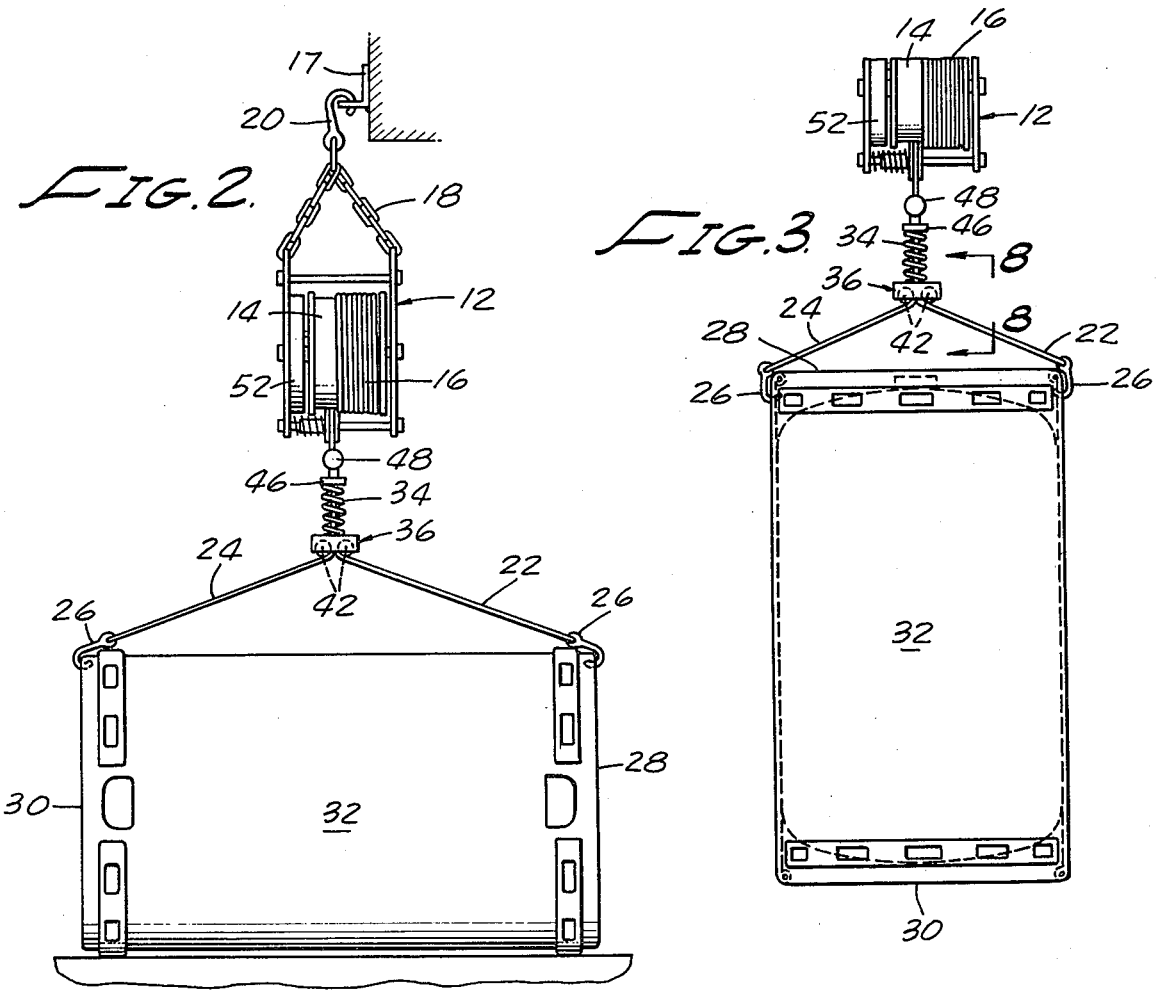
FIG. 2 is a side elevational view of the device showing the load lowering harness interconnected with the end chimes of a beer keg.
FIG. 3 is a fragmentary side elevational view similar to FIG. 2 but showing the harness of the device interconnected with only the upper chime of the beer keg.

As best seen in FIGS. 2 and 3, the load connecting means, or lowering harness, of the present embodiment of the invention includes first and second cable portions 22 and 24 having at their free ends beer keg connecting hooks 26 which are specially designed so that they can securely grip either the peripheral portions of the upper and lower keg chimes 28 and 30 of the keg, or alternatively, can grip the peripheral hand hold portions of only the upper chime 28 of the beer keg. With this arrangement, the beer keg 32 can be lowered from the delivery truck either in a horizontal orientation (FIG. 2) or in a vertical orientation (FIG. 3). In the construction shown in the drawings, cable portion 22 is merely a continuation of cable 16 while portion 24 comprises a short length of cable interconnected with cable 16 at a location several inches inboard of its extremity.

An important aspect of the load connecting means of the invention is the cushioning means thereof which is adapted to cushion the impact forces imparted to the cable 16 due to a limited free fall of the beer keg which may occur after the beer keg has been pushed from the load bay of the truck. The cushioning means also function to maintain the gripping hooks in tight engagement with keg chimes. In the present form of the invention, this cushioning means is provided in the form of an elongate coil spring 34 which is rigidly connected at one end to a support member 36 which also forms a part of the connecting means. As best seen by referring to FIG. 8, support member 36 is provided with spaced apart side walls 38 interconnected by a top wall 40. Rotatably carried between side walls 38 of the support member are a pair of spaced apart rollers 42. As illustrated in FIG. 2, cable portions 22 and 24 pass about rollers 42 and extend outwardly therefrom toward the gripping hooks 26.

The cushioning means, or coil spring 34 of the connector means is rigidly interconnected at its lower end to a cylindrical shaped boss 44 integrally formed with top wall 40 of support member 36 (FIG. 8). The opposite, or upper end of spring 34 is connected to a top cable guide assembly 46 (FIG. 2) which is slidably receivable over cable 16 inboard of the junction of cable portion 24 and cable 16. Carried at the top of assembly 46 and slidably receivable over cable 16 is a resiliently deformable spherical member 48 which is adapted to restrict upward travel of the cable 16 as it is rewound around the drum in a manner presently to be described.

The device of the present invention also includes cable rewind means operably associated with drum 14 for yieldably resisting rotation of the drum with respect to the housing as the cable 16 is paid out therefrom. Upon the cable being substantially fully paid out from the drum, the biasing means is adapted to cause rotation of the drum in a first direction so as to cause the cable to be uniformly rewound upon the drum after it has been disconnected from the load being lowered.

Referring particularly to FIG. 4, the drum 14 can be seen to be rotatably supported within housing, or cage, 12 by means of a transversely extending axle 50. The rewind means of the embodiment of the invention thereshown includes a power, or torsion spring mechanism which circumscribes axle 50. This mechanism generally designated by the numeral 52, comprises a torsion spring 54 interconnected proximate its inner end with drum 14 by means of a pin 56 and interconnected proximate its outer end with housing 12 by means of a pin 58. With this construction, when drum 14 is rotated in a second direction as the cable is paid out therefrom, torsion spring 54 becomes tightly wound and functions to provide the driving force for rewinding the cable onto the drum in a uniform manner presently to be described. An outer guard 57 is carried by housing 12 and has a circumferentially extending wall 59 which surrounds the periphery of spring 54.

After the cable 16 has been paid out from the drum, and the interconnecting means disconnected from the load, in this case, the beer keg 32, the coiled torsion spring 54 will act upon the drum to cause its rotation in a first direction to uniformly rewind the cable upon the drum. To insure uniform winding of the cable about the drum, there is provided a novel guide means generally designated in FIG. 4 by the numeral 60. Guide means 60 comprises a transverse axle 62 carried by housing 12 below drum 14 which rotatably supports a sheave-like member 64 having affixed thereto a sleeve 66 adapted to freely slide transversely along axle 62. A coiled spring 68 is also telescopically received over axle 62 and sleeve portion 66 and is disposed intermediate one face of member 64 and the inner wall 12a of housing 12 to continuously urge transverse movement of member 64 with respect to axle 62. Sheave-like member 64 is adapted to closely receive cable 16 within a groove 65 formed about the periphery thereof and is disposed in close proximity with the outer surface of drum 14. With this construction, as cable 16 is alternately paid out and rewound upon the drum, the sheave member continuously moves transversely of axle 62 to cause the coils of cable 16 to be maintained in a uniform spacing about the circumference of the drum 14.

Comprising an extremely important aspect of the present invention is a braking means carried within drum 14 which is adapted to controllably regulate the speed rotation of the drum as the cable is paid out therefrom. Referring particularly to FIGS. 4 and 5 of the drawings, the braking means of the embodiment thereshown comprises a novel planetary gear speed increaser assembly which includes an internally toothed annular shaped gear ring 70 disposed about the inner surface of the drum; at least one planet gear adapted to travel about gear ring 70; and at least one sun wheel driven by the planet gear.

In the present form of the invention, there is provided three cooperatively associated first planet gears 72 each having external teeth 74 adapted to mesh with the internal teeth 76 provided on gear ring 70. Planetary gears 72 are rotatably carried by a first support member 78 which is in turn non-rotatably connected to axle 50. Rotatably carried by axle 50 is an externally toothed first sun wheel 80 having external teeth 82 adapted to engage and be driven by the external teeth 74 of the planetary gear 72. Integrally formed with first sun gear 80 is a second support member 84 rotatably carried by axle 50 and adapted to rotatably carry a pair of second planet wheels 86. Second planetary gears 86 have external teeth 88 adapted to engage the external teeth 90 of a second sun wheel 92 which is also rotatably carried by axle 50. The external teeth 88 of second planetary gears 86 are also adapted to engage and be driven by teeth 76 formed on annular ring gear 70.

Integrally formed with second sun wheel 92 is a transversely extending base member 94 which member forms a part of a unique governor mechanism of the invention. Member 94, being integrated with sun wheel 92, rotates therewith about axle 50. Also forming a part of the governor mechanism of the invention are first and second arms 98 and 100 which are pivotally connected proximate their inner ends to base 94. The outer ends of arms 98 and 100 are movable pivotally outwardly toward the inner surface of drum 14 against the urging of biasing means shown here in the form of springs 99 which interconnect the free ends of the arms with the base 94.

Referring particularly to FIG. 5, centrifically actuated weight means are provided in the form of a pair of disc-shaped members 102 carried proximate the outer, or free, ends of arms 98 and 100. As drum 14 rotates in a second, unwinding direction, the sun wheel 92 and the base 94, which is affixed thereto, will be rotated at a rapid rate of speed as a result of the construction of the planetary gear speed increaser mechanism just described. Due to centrifugal force, rapid rotation of base 94 will cause weights 102 and the free ends of arms 98 and 100 to be urged outwardly toward the inner surfaces of the drum 14. This outer movement of arms 98 and 100 will cause a pair of uniquely constructed brake elements 103 also carried by arms 98 and 100 to move into pressurial engagement with the integral surfaces 14b of the drum 14 (FIG. 4). Brake elements 103 comprise a base 106 which is affixed to the first and second arms of the governor mechanism and include novel drum engaging pads 108 which are adapted to engage the internal surfaces 14b of the drum. Pads 108 may be formed of a variety of materials including asbestos composites and carbon and graphite materials. Due to unique characteristics of these latter materials, whereby the coefficient of friction increases as the temperature increases, such materials have been found ideally suited for use in the present application.

The drum 14 and the gears comprising the speed increaser mechanism can be constructed of any suitable light weight material such as plastic, aluminum, magnesium or steel. Similarly, the housing or cage 12 can be constructed of lightweight metal and may be of an open construction as shown in the drawings, or can be provided in the form of a closed housing adapted to totally enclose the drum 14, the rewind means, and the cable guide means.

In using the device of the invention it is first interconnected in the manner shown in FIG. 1 with a rigid support located in the upper part of the load bay of the truck. The load connecting means, or harness, is then connected with a filled beer keg, either in the manner illustrated in FIG. 2, or in the manner illustrated in FIG.

3. The filled keg is then pushed from the truck. The weight of the keg acting upon the cable 16 causes the drum 14 to rotate in a second direction. This in turn causes rotation of the gears of the speed increaser mechanism and the automatic engagement of the braking elements of the centrifugally activated braking system with the internal surfaces of the drum in the manner previously described herein. This uniform braking action enables the keg to be lowered safely and gently to the ground at a controlled rate of speed. During this keg lowering step, the spring of the rewind mechanism is wound so that upon disconnecting the harness assembly from the keg, the cable 16 will be automatically rewound upon the drum with the cable means functioning to uniformly pack the coils of the cable about the periphery of the drum.

Referring to FIGS. 6 and 7 there is illustrated an alternate form of the load lowering device of the invention. As indicated by FIG. 4, the design of the alternate form of the invention is somewhat similar to that described in the preceeding paragraphs and like numerals will be used in FIGS. 6 and 7 to identify like components.

Turning particularly to FIG. 6, the apparatus of this embodiment can be seen to comprise an outer housing, or cage 120, an axle 50 extending transversely of the housing, a drum 14 rotatably carried by axle 50 and a length of wire or cable 122 adapted to be wound upon drum 14. Disposed within drum 14 is a planetary gear speed increaser mechanism and a braking means identical to those shown in FIG. 4 and previously described in detail herein. However, as best seen in FIG. 6 the load lowering harness associated with the free end of cable 122 is of different construction, being provided in the form of a sling or personnel leg harness 124. Harness 124 is interconnected with the free end of cable 122 by any suitable means and is adapted to safely and securely support a conscious or unconscious person in a sitting position illustrated in the drawing.

Cable 122 is also of a different construction from that shown in FIGS. 1 through 5. Because the cable must be of a length sufficient to lower a person several hundred feet, as for example, from the upper stories of a building, the cable must be much longer and must be of a smaller diameter so that it can be wound in several layers upon drum 14 in the manner shown in FIG. 7. Although various materials can be used in forming cable 120, a small diameter, high tensile strength steel wire has proven quite suitable.

In using the device of the invention as an escape device in the manner shown in FIG. 6, the hook 124 of the connecting means of the device is first secured to a window sill, or other suitable rigid support member within the building. The evacuee then positions himself in the leg sling as shown in FIG. 6 and lowers himself from the window. The weight of the person causes the drum 14 to rotate in a second direction driving the speed increaser mechanism which in turn drives the governor means and the braking means of the invention as previously described to precisely control the speed of rotation of the drum and the rate of descent of the evacuee. Once the evacuee safely reaches the ground the cable 122 is automatically rewound onto the drum by the rewind mechanism 53 in the manner previously described.

Because the unit is lightweight and easily portable, it may be readily moved about the building to aid in the rescue of other trapped persons. Due to its sturdiness and reliability it may safely be used time after time in connection with the same fire, earthquake or other emergency situation.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A load lowering device comprising:
   (a) a housing;
   (b) interconnecting means for removably interconnecting said housing to a rigid support member;
   (c) an axle extending transversely of said housing;
   (d) a hollow drum mounted for rotation within said housing about said axle;
   (e) a length of cable adapted to be uniformly wound about said drum upon rotation of said drum in a first direction and adapted to be paid out from said drum upon rotation of said drum in a second, opposite direction; said cable having an inner end disposed within said housing and having a free outer end;
   (f) cable rewind means operably associated with said drum for yieldably resisting rotation of said drum in said second direction when said cable is paid out from said drum, said means being adapted to cause rotation of said drum in said first direction upon said cable being substantially paid out thereby causing said cable to be rewound upon said drum;
   (g) guide means associated with said housing for guiding the travel of said cable with respect to said drum as said cable is rewound thereupon;
   (h) braking means carried within said drum adapted to yieldably resist rotation of said drum in said second direction to control the rate at which said cable is unwound from said drum, said braking means comprising:
   (1) an internally toothed, annular shaped gear ring affixed to the inner surface of said hollow drum;
   (2) a first support disposed within said hollow drum and affixed to said axle;
   (3) at least one first planet gear rotatably carried by said first support and being adapted to engage said gear ring and be driven thereby as said drum rotates; p2 (4) an externally toothed first sun wheel rotatably carried by said axle and adapted to engage and be rotatably driven by said first planet gear;
   (5) a second support rotatably carried by said axle within said hollow drum and affixed to said sun wheel for rotation therewith;
   (6) at least one second planet gear rotatably carried by said second support and being adapted to engage said ring gear and be driven thereby as said drum rotates;
   (7) an externally toothed second sun wheel rotatably carried by said axle and adapted to engage and be rotatably driven by said second planet gear;
   (8) a governor mechanism rotatably carried by said axle and operably associated with said second sun wheel; and (9) braking elements associated with said governor mechanism for actuation thereby upon rotation of said drum to bring said elements into pressural engagement with a braking surface provided internally of said drum; and (i) load connecting means associated with said outer end of said cable for connecting said cable to the load to be lowered, said means including cushioning means for cushioning the impact forces imparted to said cable due to a limited free fall of the load with respect to the outer end of said cable subsequent to the interconnection of the load connecting means with the load.

2. A load lowering device as defined in claim 1 in which said governor mechanism comprises:
   (a) a base connected to said second sun wheel;
   (b) first and second arms pivotally connected to said base;
   (c) weight means carried by said first and second arms for urging pivotal movement thereof radially outwardly from said axle upon rotation of said second sun wheel; and
   (d) biasing means connected to said base and adapted to yieldably resist pivotal movement of said first and second arms.

3. A load lowering device as defined in claim 2 in which said braking elements are carried by said first and second arms of said governor mechanism.

4. A load lowering device as defined in claim 3 in which each of said braking elements comprises a base affixed to said first and second arms of said governor and a drum engaging pad carried by said base and constructed to a graphite material.

5. A load lowering device comprising:
   (a) a hollow rotatable drum;
   (b) means for interconnecting said drum with a rigid support member;
   (c) a length of cable adapted to be uniformly wound about said drum upon rotation of said drum in a first direction and adapted to be paid out from said drum upon rotation of said drum in a second, opposite direction; said cable having an inner end disposed proximate said drum and having a free outer end;
   (d) braking means carried within said drum adapted to yieldably resist rotation of said drum in a second direction to control the rate at which said cable is unwound from said drum, said braking means comprising:
      (1) an internally toothed, annular shaped gear ring affixed to the inner surface of said hollow drum;
      (2) a first support disposed within said hollow drum and affixed to said axle;
      (3) at least one first planet gear rotatably carried by said first support and being adapted to engage said gear ring and be driven thereby as said drum rotates;
      (4) an externally toothed first sun wheel rotatably carried by said axle and adapted to engage and be rotatably driven by first planet gear;
      (5) a second support rotatably carried by said axle within said hollow drum and affixed to said sun wheel for rotation therewith;
      (6) at least one second planet gear rotatably carried by said second support and being adapted to engage said ring gear and be driven thereby as said drum rotates;
      (7) an externally toothed second sun wheel rotatably carried by said axle and adapted to engage and be rotatably driven by said second planet gear;
      (8) a governor mechanism rotatably carried by said axle and operably associated with said second sun wheel; and
      (9) braking elements associated with said governor mechanism for actuation thereby upon rotation of said drum to bring said elements into pressural engagement with a braking surface provided internally of said drum; and
   (e) load connecting means associated with said outer end of said cable for connecting said cable to the load to be lowered.

6. A load lowering device as defined in claim 5 in which said load connecting means includes cushioning means for cushioning the impact forces imparted to said cable due to a limited free fall of the load with respect to the outer end of said cable subsequent to the interconnection of the load connecting means with the load.

7. A load lowering device as defined in claim 5 including cable rewind means operably associated with said drum for yieldably resisting rotation of said drum in a second direction when said cable is paid out from said drum, said means being adapted to cause rotation of said drum in a first direction upon said cable being substantially paid out thereby causing said cable to be rewound upon said drum.

8. A load lowering device as defined in claim 7 including guide means for guiding the travel of said cable with respect to said drum as said cable is rewound thereupon.

9. A load lowering device for lowering beer kegs from the loading bay of a delivery truck comprising:
   (a) a hollow rotatable drum;
   (b) means for interconnecting said drum with a rigid support member disposed within the loading bay of the delivery truck;
   (c) a length of cable adapted to be uniformly wound about said drum upon rotation of said drum in a first direction and adapted to be paid out from said drum upon rotation of said drum in a second, opposite direction; said cable having an inner end disposed proximate said drum and having a free outer end;
   (d) braking means carried within said drum adapted to yieldably resist rotation of said drum in a second direction to control the rate at which said cable is unwound from said drum, said braking means comprising:
      (1) an internally toothed, annular shaped gear ring affixed to the inner surface of said hollow drum;
      (2) a first support disposed within said hollow drum and affixed to said axle;
      (3) at least one first planet gear rotatably carried by said first support and being adapted to engage said gear ring and be driven thereby as said drum rotates;
      (4) an externally toothed first sun wheel rotatably carried by said axle and adapted to engage and be rotatably driven by first planet gear;
      (5) a second support rotatably carried by said axle within said hollow drum and affixed to said sun wheel for rotation therewith;
      (6) at least one second planet gear rotatably carried by said second support and being adapted to engage said ring gear and be driven thereby as said drum rotates;

(7) an externally toothed second sun wheel rotatably carried by said axle and adapted to engage and be rotatably driven by said second planet gear;

(8) a governor mechanism rotatably carried by said axle and operably associated with said second sun wheel; and (9) braking elements associated with said governor mechanism for actuation thereby upon rotation of said drum to bring said elements into pressural engagement with a braking surface provided internally of said drum; and (e) a beer keg connecting harness associated with said outer end of said cable for connecting said cable to a beer keg to be lowered from the delivery truck, said harness including cushioning means for cushioning the impact forces imparted to said cable due to a limited free fall of the beer keg with respect to the outer end of said cable subsequent to the interconnection of the beer keg connecting means with the beer keg.

10. A load lowering device as defined in claim 9 including cable rewind means operably associated with said drum for yieldably resisting rotation of said drum in a second direction when said cable is paid out from said drum, said means being adapted to cause rotation of said drum in a first direction upon said cable being substantially paid out thereby causing said cable to be rewound upon said drum.

* * * * *